United States Patent [19]
Baldwin

[11] Patent Number: 5,280,353
[45] Date of Patent: Jan. 18, 1994

[54] METHOD AND APPARATUS FOR SIGNAL PROCESSING BY INTERPOLATION AND FILTERING WITH SIMULTANEOUS FREQUENCY RESPONSE COMPENSATION AND OFFSET GENERATION

[75] Inventor: John L. E. Baldwin, Eastleigh, England

[73] Assignee: Rank Cintel Limited, Great Britain

[21] Appl. No.: 792,946

Related U.S. Application Data

[63] Continuation-in-part of PCT/GB90/01278, filed Aug. 14, 1990.

[22] Filed: Nov. 15, 1991

[30] Foreign Application Priority Data

| Nov. 16, 1990 | [GB] | United Kingdom | 9024971 |
| Mar. 6, 1991 | [GB] | United Kingdom | 9104695 |
| Aug. 15, 1989 | [GB] | United Kingdom | 8918560 |

[51] Int. Cl.$^5$ ............................................... H04N 5/202
[52] U.S. Cl. ..................... 358/164; 364/724.16; 358/166
[58] Field of Search ............... 358/160, 167, 186, 138; 375/14, 103; 364/724.16; H04N 9/64, 164, 32, 9/69, 5/202

[56] References Cited

U.S. PATENT DOCUMENTS

| 4,278,995 | 7/1981 | Fearnside et al. | |
| 4,583,120 | 4/1986 | Murakami et al. | 358/166 X |
| 4,730,342 | 3/1988 | Saito | 364/724.16 X |
| 4,862,403 | 8/1989 | Iwase et al. | 364/724.16 |
| 5,067,137 | 11/1991 | Kaneko | 375/14 |
| 5,144,434 | 9/1992 | Yamashita et al. | 358/166 |

FOREIGN PATENT DOCUMENTS 0162507 11/1985 European Pat. Off. .
2143046 1/1985 United Kingdom .

Primary Examiner—Victor R. Kostak
Attorney, Agent, or Firm—Ostrolenk, Faber, Gerb & Soffen

[57] ABSTRACT

A sampled input signal, e.g. a video signal, is processed to provide output signals appropriate for positions between input samples by interpolating between the input samples using an interpolating transversal filter (110) and filtering the interpolated signal with a second filter (150) the gain of which increases with increasing frequency. The coefficients of the interpolating transversal filter are chosen so as simultaneously to compensate the frequency response of the second filter and to provide a desired position offset of the output samples with respect to the input samples. The interpolation and filtering steps may be reversed in order. Surprisingly the interpolation is improved in quality when it incorporates a de-emphasis operation in this way. The sampling may be the sampling achieved by the video signal line structure. A non-linear circuit (140) such as a gamma corrector may be interposed between the interpolator and the equalizer. The system can in particular be used to process the video output of a telecine, or to process digital audio signals.

27 Claims, 7 Drawing Sheets

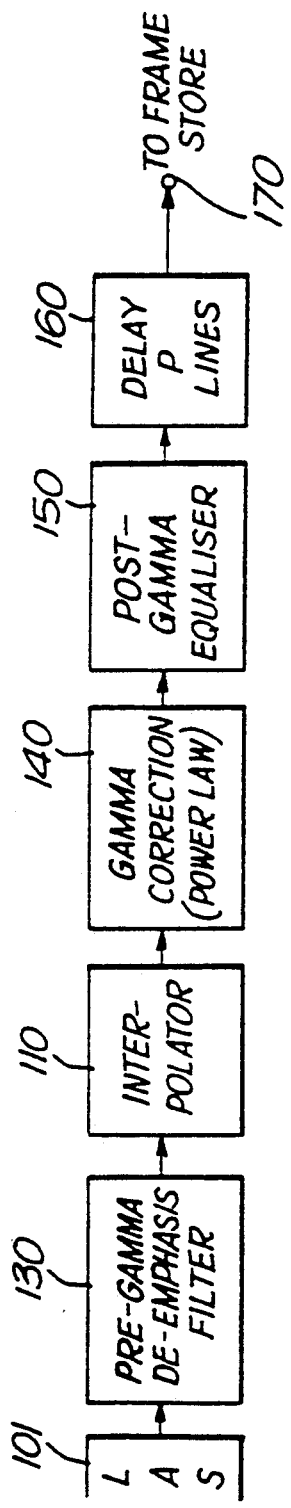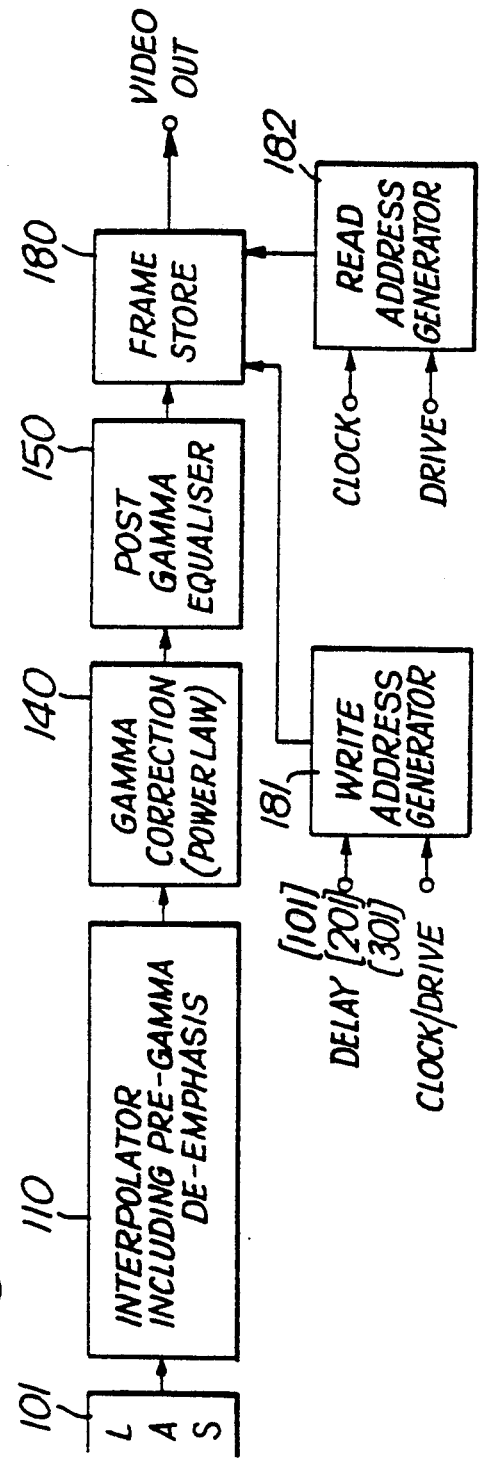

5,280,353

METHOD AND APPARATUS FOR SIGNAL PROCESSING BY INTERPOLATION AND FILTERING WITH SIMULTANEOUS FREQUENCY RESPONSE COMPENSATION AND OFFSET GENERATION

CROSS-REFERENCE TO RELATED APPLICATION

This application is a continuation-in-part of International Patent Application No. PCT/GB90/01278, international filing date Aug. 14, 1990.

BACKGROUND OF THE INVENTION

This invention relates to a method and apparatus for use in signal processing of sampled signals, particularly but not exclusively to an interpolator used for what is known as vertical interpolation of video signals, i.e. for combining and interpolating between the signals occurring on successive lines (as opposed to horizontal or temporal interpolation). Such interpolators may be used in systems such as SECAM or MAC where the two color component signals are transmitted on alternate lines, or in standards converters, or in special effects processors where picture height or width is to be changed, or in a variety of other situations.

International Patent Application No. PCT/GB90/01278 publication No. WO91/03122 (publication date Mar. 7, 1991) describes digital video signal processing equipment including a circuit providing a smooth non-linear processing function such as for example a gamma corrector. In that application it is proposed that high frequency (HF) components resulting from the non-linearity, which may appear as spurious low frequencies due to mirror image spectral reflection (aliasing) in the digital sampling frequency, should be reduced. This is achieved by attenuating high frequency signal components before the gamma corrector, and equalising them thereafter. Both the modifier and the equaliser providing this pre-gamma de-emphasis and post-gamma equalisation respectively may take the form of transversal filters. Neither the modifier nor the equaliser have anything to do with interpolation either vertical, horizontal or temporal.

SUMMARY OF THE INVENTION

I have now found that interpolation can be surprisingly improved in quality if the interpolation is done in combination with such pre-gamma HF de-emphasis and post-gamma equalisation. Where there is signalling processing requiring de-emphasis and equalisation in this way, a subjective improvement in quality can be achieved, with less circuitry, by placing the interpolator at the point where de-emphasis is to be applied and altering the coefficients used in the interpolator so it simultaneously provides de-emphasis.

The invention is defined in the appended claims to which reference should now be made.

BRIEF DESCRIPTION OF THE DRAWINGS

The invention will now be described in more detail, by way of example, with reference to the drawings, in which:

FIG. 2 is a block diagram of a signal processing circuit embodying the invention that can be used to process one of the outputs of the telecine of FIG. 1;

FIG. 3 shows a variant of the signal processing circuit of FIG. 2;

DETAILED DESCRIPTION OF THE PREFERRED EMBODIMENT

The invention will be described by way of example in the context of a continuous-motion line-array telecine.

Figure 1:
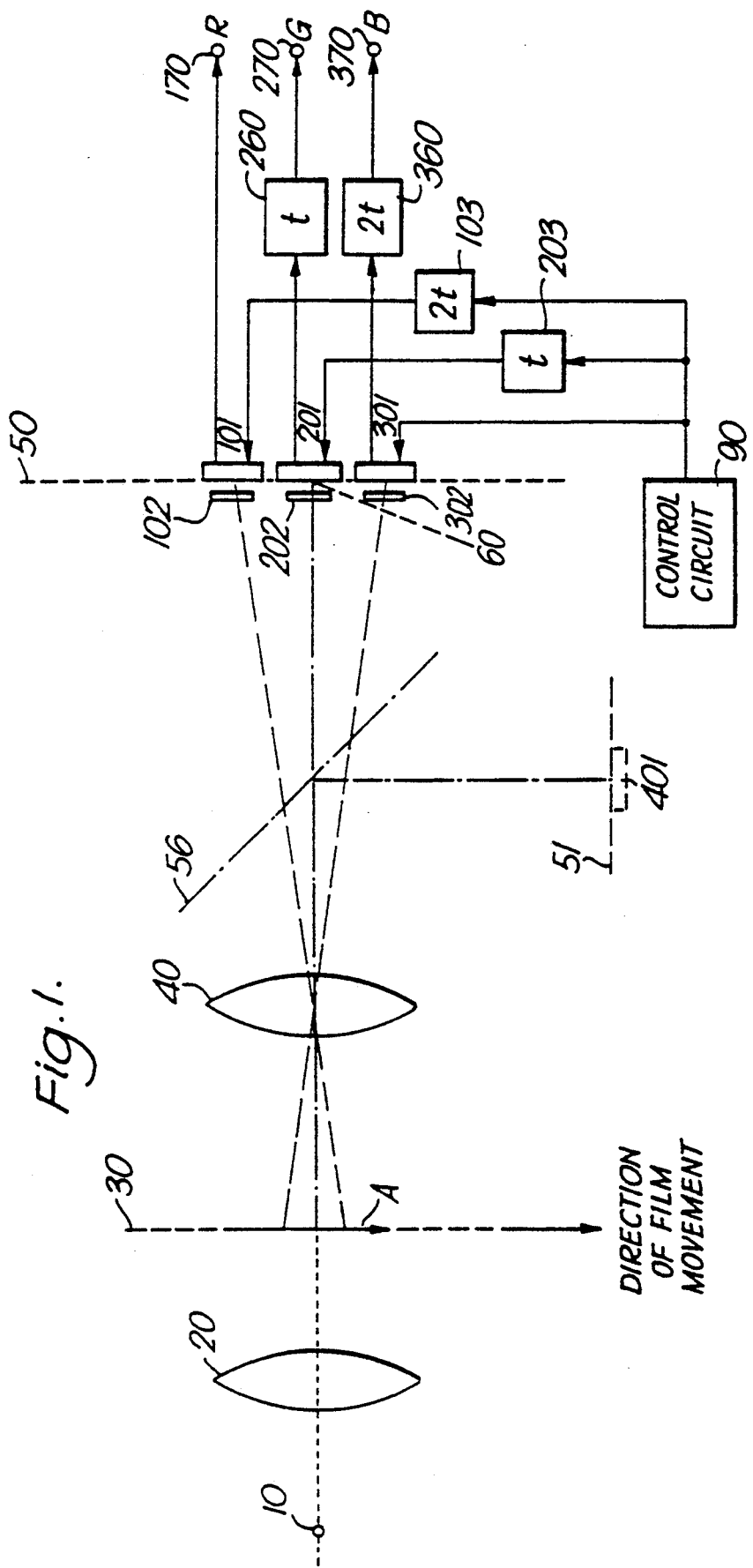
FIG. 1 illustrates a continuous-motion line-array color telecine with which the preferred embodiment of the invention can be used.

FIG. 1 diagrammatically shows the optical path of a continuous-motion line-array color telecine. FIG. 1 does not represent a particular known telecine but illustrates various features to be found in such telecines. A linear light source 10, which may use a mirror for reinforcement, is used to illuminate uniformly an area of cinematographic film which includes the line to be scanned, with the aid of a condenser system 20. The film is moved continuously at a uniform rate which provides the vertical scan during each film frame. The film motion in the film plane 30 is downwards, as shown in FIG. 1. The arrow A in the film gate represents an upward pointing arrow in the scene.

An object lens 40 is arranged to focus the film plane 30 onto the image plane 50. For a monochrome telecine a single linear array sensor would be placed on the optical axis at the point 60 with its length perpendicular to the plane of the paper. The light falling on each of the consecutive equispaced elements of the array is proportional to the light transmitted through consecutive equispaced elementary areas in a line across the film.

The details of reading out information from the linear array sensor will not be described in detail, as they will be known to those skilled in the art, but the specific requirements are as follows. During a film frame, the read out of consecutive lines occurs at equal intervals of time, the time interval being chosen so that the vertical spacing of the scanning lines is correct. This requires consideration of the speed of motion of the film, the width of the scanned areas on the film, the required aspect ratio and the number of active lines in a frame. If film prints are intended for anamorphic projection the extent of the squeeze also needs to be considered.

The film motion causes each film frame to be scanned once in the vertical direction, giving a progressive or non-interlaced scan, so interlace is produced by writing the information sequentially into a frame store and reading alternate lines from the store on one field and the other lines from the store on the next field. Depending on the standards of the film in terms of film frames per second and the field frequency of the television system, the number of field read-outs from the store varies, but it is important to maintain the interlace of the signal read-out.

It is usual for the ratio of (a) the desired height of the picture to be scanned in the active television lines, to (b) the spacing between like points of successive film frames, to differ from the ratio of the active field duration to the total field duration. This may be overcome most elegantly by starting the line scan operation at the beginning of each frame at the same point with respect to each successive film frame. However, other solutions are possible but often they provide only an approximation to the requirements.

The constant velocity of the film provides the motion which results in the vertical scan. However, it may be easier to think of this providing a motion of the image in the image plane 50. The horizontal scanning of this image occurs in the linear array.

To provide a color telecine, the light from the film has to be led to three linear array sensors for the red, green and blue components, respectively. This could be achieved by using a splitter block containing dichroic optical filters to provide wavelength-dependent splitting. However, the need for a splitting block may be avoided by placing the three linear array sensors, one above another, as shown at 101, 201 and 301 respectively in FIG. 1. Each of the three linear array sensors has an optical filter 102, 202, 302 with an appropriate pass-band to make the individual sensors respond essentially only to red, green and blue light, for sensors 101, 201 and 301 respectively. The order of the sensors is essentially arbitrary. It should be noted that the figure is not to scale.

FIG. 1 also shows an optical partially-reflecting surface 56, which may be used to provide a second image plane 51 for further linear array sensors, the proportion of light reflected to that transmitted being either constant or wavelength dependent. In FIG. 1 this surface provides an optical path to a fourth linear array sensor 401, which may be a luminance sensor. This sensor is so positioned that it is observing the same line on the film as sensor 201. The number of linear array sensors using the reflecting path need not be limited to one. Indeed there is no absolute limit to the number of sensors using either the direct or reflecting path.

It will be noted that a single line on the film will first be imaged on the sensor 301. Then, after the film has travelled a short distance, this line on the film will be imaged on sensor 201. Again, after a further short distance, the same line on the film will be imaged on the sensor 101.

At any one instant, the three sensors 101, 201, 301 are responding to light passing through the film along three different lines across the film. It is necessary that the light source 10 should illuminate all the lines to which, at any time, the sensors are responding. The condenser system is designed with this in mind.

Without correction, the separation of the lines on the film that the sensors are responding to, would cause severe vertical misregistration of the colors. This misregistration may be decreased by reducing the separation between the sensors but it can not be completely removed and the remaining error will still need to be compensated. Compensation is achieved by delaying two of the signals by an amount equal in each case to the time by which it would otherwise be advanced with respect to the third signal. These time delays will depend on the velocity of the film, and it is also necessary to arrange that the timing of the start of the line scans of each advanced sensor is such that, when the signal has been delayed to remove the vertical misregistration, the timing of the start of the line of the delayed signal must be the same as that of the signal from the sensor which needs no delay.

The arrangements for this are illustrated diagrammatically in FIG. 1. The output of sensor 101 is applied directly to an output 170 for the R signal. The output of sensor 201 is applied to an output 270 for the G signal through a delay 260 providing a delay of time t. The output of sensor 301 is applied to an output 370 for the B signal through a delay 360 providing a delay of time 2t. Corresponding adjustments will generally have to be made to the control signals used to cause the sensors to start to produce a new line. Line scan control circuit 90 produces the necessary scan-control signals. As illustrated, read-out clock signals commanding the sensors to start to output a new line are applied directly to sensor 301, through a delay 203 providing a delay of time t to sensor 201, and through a delay 103 providing a delay of time 2t to sensor 101. The delays 103 and 203 are illustrative only and their function could be subsumed into the control circuit 90.

An example of a known telecine scanning system of essentially the above type is to be found in U.S. Pat. No. 4,275,995.

The need to have different timing for the start of the line scans for the three sensors is disadvantageous, but the separation of the sensors may be varied to alter the required delay. This is used to make the required delays equal to multiples of the line scanning period, so that the same timing can be used for the start of the line scanning for all three sensors. For systems where there is a disturbance to the line scan during the vertical blanking period there is a potential fundamental problem, to this solution; this would arise if the time difference, between the longest and shortest signal delays, was greater than the time between the end of scanning the active part of one frame of the film and the beginning of scanning the active part of the next frame.

The same line scan timing for all the sensors has certain benefits. It may make it possible to incorporate all three sensors in one device, leading to significant further benefits. For example, the sensors are likely to have more similar characteristics, reducing the probability of undesired color shading across the width of the picture. Other advantages accrue, for example the sensors can be brought closer to each other so decreasing the amount of compensating delay.

However, there is the disadvantage that the spacing between the sensors must correspond to an integral number of picture lines on the image plane. This causes problems when the telecine is to be designed to produce television signals to different television standards. The picture line separation depends on the number of active lines of the television standard and on the effective height of the image of the film frame to be scanned. If the picture width be assumed constant and the spacing between sensors be 8 lines on a 1250 line 16:9 aspect ratio picture, this spacing would correspond to 6 lines for a 4:3 aspect ratio picture. The same spacing would correspond to 4 lines on a 625 line 16:9 standard and 3 lines if the aspect ratio be 4:3.

However, the same spacing would not correspond to an integral number of lines on a 1050 line or on a 525 line standard with either 16:9 or 4:3 aspect ratios. A different spacing would be required and yet another would be required for 1125 line 16:9 aspect ratio. Similar problems arise when different film formats are to be scanned.

Sometimes it is convenient to arrange a plurality of sensors with a lower number of elements to behave like an array of greater length. These sensors may look at different lines or parts of lines on the film image and the resulting signals combined by means including delays. The sensors may look at different parts of a line but a number of alternative approaches are possible. These include one in which the sensors respond to every nth column in a picture. In this case, if there were 3 sensors, one would respond to elements in columns 1, 4, 7 . . . , the second to elements in columns 2, 5, 8 . . . and the third to elements in columns 3, 6, 9 etc.

In another arrangement, four line array sensors may be used to generate one scanning line, i.e. a monochrome signal. This may be done so as to provide a high resolution along the scan line; if a single array is used for this purpose the clock speeds required to read-out the contents of the array may be impossibly high. The four arrays are arranged in a so-called castellated form, with the first and third arrays at one vertical position and the second and fourth arrays at a slightly different vertical position. This form can be used to avoid any discontinuity at the transition points. Appropriate electronic delays are of course required as well as means to change the clock frequency. However, it will be apparent that there is again a situation where arrays which are supposed to relate to a single scanning line are spaced apart in the direction of film motion. The same problem as just discussed for a color device will thus apply for an individual component if multiple standards or formats are attempted.

An important case would be the use of this castellated approach providing improved definition for the luminance component in combination with the more normal approach for the color components where definition is, by comparison, less important.

The output of each of the channels of FIG. 1 has to undergo conventional signal processing, including being applied to a gamma corrector to provide pre-correction for a standard non-linear gamma factor inherent in the design of cathode ray tube display devices. The signal also has to undergo a delay of an integral number of lines to compensate for the vertical spacing between the sensors 101, 201, 301. It is preferred that the gamma correction precedes the delay as this reduces the dynamic range requirement through the delay.

The production of unwanted alias components (corresponding to spectral reflection mirrored in the vertical sampling frequency i.e. the line frequency) is reduced by modifying the frequency response of the signal applied to the gamma corrector. The modification involves reducing the amplitude of the high vertical frequency components prior to the gamma corrector, and correspondingly reinstating the overall frequency response thereafter.

Conventional pre-emphasis and de-emphasis networks that are used with frequency modulation have significant but complementary group delay errors. In comparison the preferred embodiment uses a pre-gamma filter with zero or negligible group delay error. Since the equaliser has complementary characteristics it will likewise have a zero or negligible group delay error. Furthermore, the pre-gamma filter of the preferred embodiment has a decreasing gain with increasing frequency, providing de-emphasis, whereas conventional pre-emphasis provides a gain which increases with increasing frequency.

The high-frequency pre-gamma de-emphasis operates to relatively attenuate higher frequency signals, that is frequencies approaching half the vertical sampling frequency, more particularly at frequencies approaching or exceeding one-third of the sampling frequency.

FIG. 2 shows in diagrammatic form, the processing for a preferred color linear-array telecine according to the invention. One only of the three identical channels is shown.

FIG. 2 shows the line array sensor 101 connected to a pre-gamma HF de-emphasis filter 130 having an interpolator 110 connected to its output. The interpolator supplies a signal which is applied through a gamma corrector 140, and a post-gamma equaliser 150, to a delay 160 providing a delay of p lines. The delay output at 170 is applied to a frame store, which may be used to convert the progressively-scanned (not-interlaced) signal into a signal in interlaced form. The circuitry associated with the sensors 201 and 301 is similar subject to alteration of the delay period.

It should be noted that the term "de-emphasis" is used here, rather than the term "pre-emphasis", as the function provided is one in which the gain generally decreases with increasing vertical frequency. The compensating function is provided by the "equaliser".

In accordance with this invention I have found that subjectively better results are obtained, surprisingly, if the interpolation itself incorporates the pre-gamma de-emphasis.

The post-gamma equaliser may be anywhere in the signal chain after the gamma corrector. The delays 160, 260, 360 providing integral numbers of lines delay may be anywhere after the linear array sensors, although usually it will be most convenient if each is realised, not by specific hardware, but by appropriately altering the addressing of the frame store used for progressive-to-interlace conversion, preferably on the write addressing, though it could be on read addressing.

FIG. 3 shows preferred embodiment of one of three similar channels required for a color telecine, in which the function of pre-gamma de-emphasis is included in the characteristics of the interpolator 110, in accordance with this invention. The frequency response of the interpolator is required to be that of a slow roll-off low pass filter instead of a sharp cut-off filter; for example the gain at half the Nyquist limit may be 6 dB down compared to the low frequency gain. This change of response only needs a change of the interpolation coefficients. The computation of these coefficients is described later.

FIG. 3 also indicates how the delay of integral lines, namely the delay 160 of FIG. 2, can usually be replaced by appropriate operation of the frame store 180 needed to convert the progressive output of the linear arrays into an interlaced signal. For this purpose the write address generator 181 associated with the frame store 180 receives a delay instruction appropriate to the sensor 101, 201 or 301 as well as the usual clock/drive signals. The read address generator 182 functions normally. The operation of this conversion will be understood by those skilled in the art and will not be described.

The physical separation of the linear array sensors results in the three arrays observing different horizontal lines on the film image so causing misregistration.

It is necessary to calculate the relationship between the physical separation and the misregistration in scanning lines. The height of the film image is equal to the width of the film image divided by the Aspect Ratio. In this calculation a 4:3 Aspect Ratio (AR) is expressed as 1.333, whilst a 16:9 AR would be 1.777. The spacing of the scanning lines is the image height divided by the number of active lines in the television standard. Knowing the spacing of the scanning lines and the physical separation between the linear array sensors the misregistration in scanning lines can be calculated. The above assumes that the film is not intended for anamorphic projection.

It should be realised that the horizontal scanning frequency of the linear array sensors has to result in the appropriate number of active lines in the desired film image height and this is a function of a number of parameters including the Aspect Ratio to be scanned, the number of active lines in the standard and the speed of motion of the film.

It is always possible to arrange that the physical separation of the array sensors corresponds to an integral number of scanning lines for one chosen set of operating conditions. Sometimes it is possible to arrange this integral relationship for two wanted sets of operating conditions, and sometimes more, but as the number of sets of operating conditions increase this integral relationship cannot be maintained.

If the separation be 8 lines for a 1250 line 16:9 standard, it would be 6 lines for a 4:3 aspect ratio; for the 625 line standard, it would be 4 lines for 16:9 and 3 lines for a 4:3 aspect ratio. However, if the same physical separation be used, for 1050 line the figures would be 6.72 and 5.04, whilst it would become 3.36 and 2.52 on the 525 line standard. Again, the same physical separation on a 1125 line 16:9 standard would result in 7.20 lines misregistration.

Even if the basic operation were on the 1250 line 16:9 standard, a change of desired vertical scanned height by 1% would cause a misregistration of 0.08 line, which is near the limit of acceptability.

It is convenient to arrange that the interpolator 110 has a range of adjustment of ±0.5 line and, if the green interpolator is assumed to give zero shift, the interpolators in the other channels can be used so that a balance of an integral number of lines remains to be corrected by the write address generator 181. If the figures given above are used, then for 1050 line 16:9, the red channel would need to be advanced by 6.72 line; this would be achieved by interpolation causing a delaying shift of 0.28 line pitch and an alteration of the write address to cause an advance of 7 lines. For the blue channel the interpolation would produce an advancing shift of 0.28 line pitch and the alteration of the write address to cause a delay of 7 lines.

It is probably easier to consider that the write address sequence for the blue frame store will be used 7 lines later for the green frame store; a further 7 lines later the same write address sequence will be used for the red frame store. This assumes that the blue, green and red frame stores are to be read simultaneously, using one read address generator.

Figure 4:
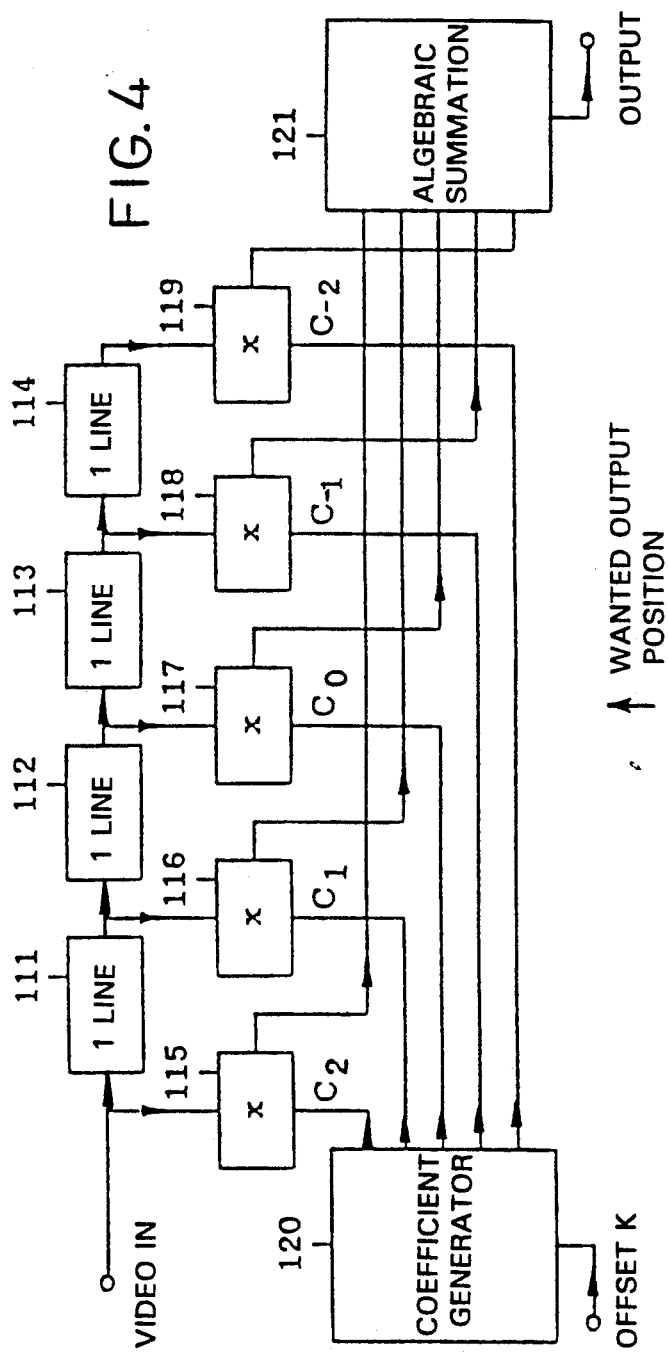
FIG. 4 illustrates in greater detail the construction of the pre-gamma HF de-emphasis and interpolation circuit shown in FIG. 3.

In FIG. 4 the outputs from four series-connected line delays 114, 113, 112, 111 and the input to line delay 111 will always represent signals from points successively lower on a short vertical line. The highest point on this line will correspond to the signal at the output of the last line delay 114 and the lowest point will correspond to the input of the first lined delay 111. It is assumed that the line numbers increase with successive picture lines and are numbered with respect to the central line. The signals appearing at points $-2$, $-1$, 0, 1, 2 are multiplied in multipliers 115 to 119 by their appropriate weighting coefficients $C-2$, $C-1$, C0, C1, C2 and the products are algebraically summed in a summation circuit 121. The coefficients are produced, under the control of the offset k, by the coefficient generator 120.

When offset k has a value of $+0.5$, which is the maximum, the output would be appropriate for a line position half a line pitch below the central line. As the value of k decreases, the output would be appropriate for higher line positions until it reaches a position half a line above the central line when $k = -0.5$.

Figure 6:
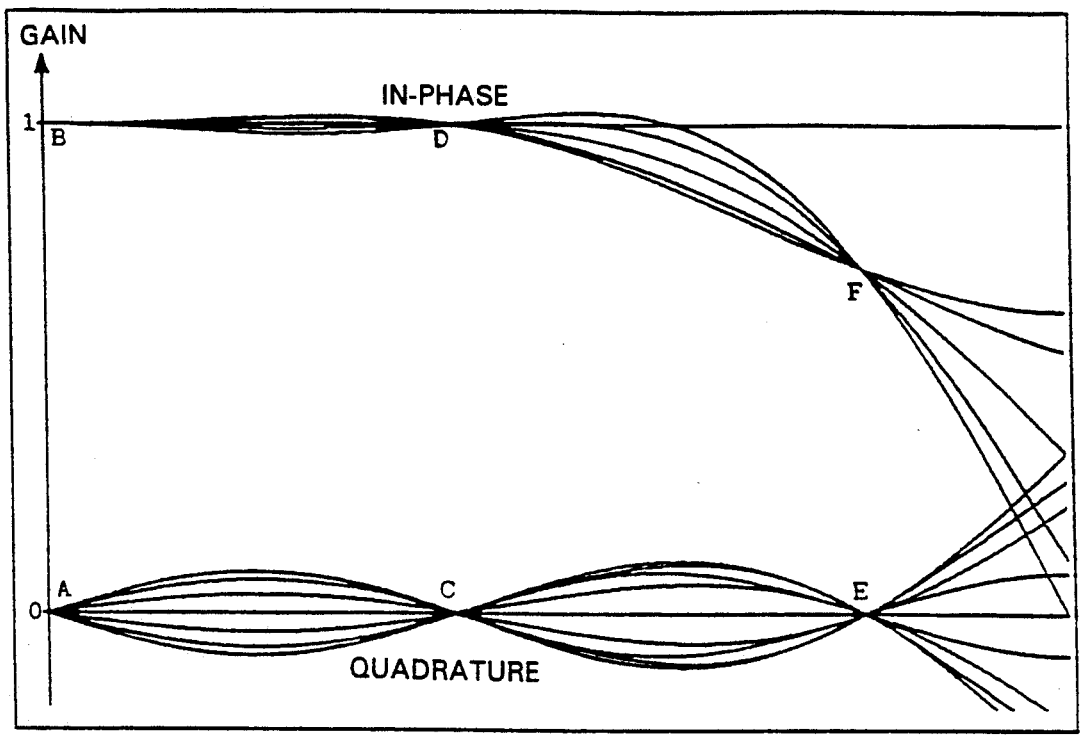
FIG. 6 shows the vertical frequency response of an interpolator, indicating in-phase and quadrature errors without pre-gamma de-emphasis.
Figure 8:
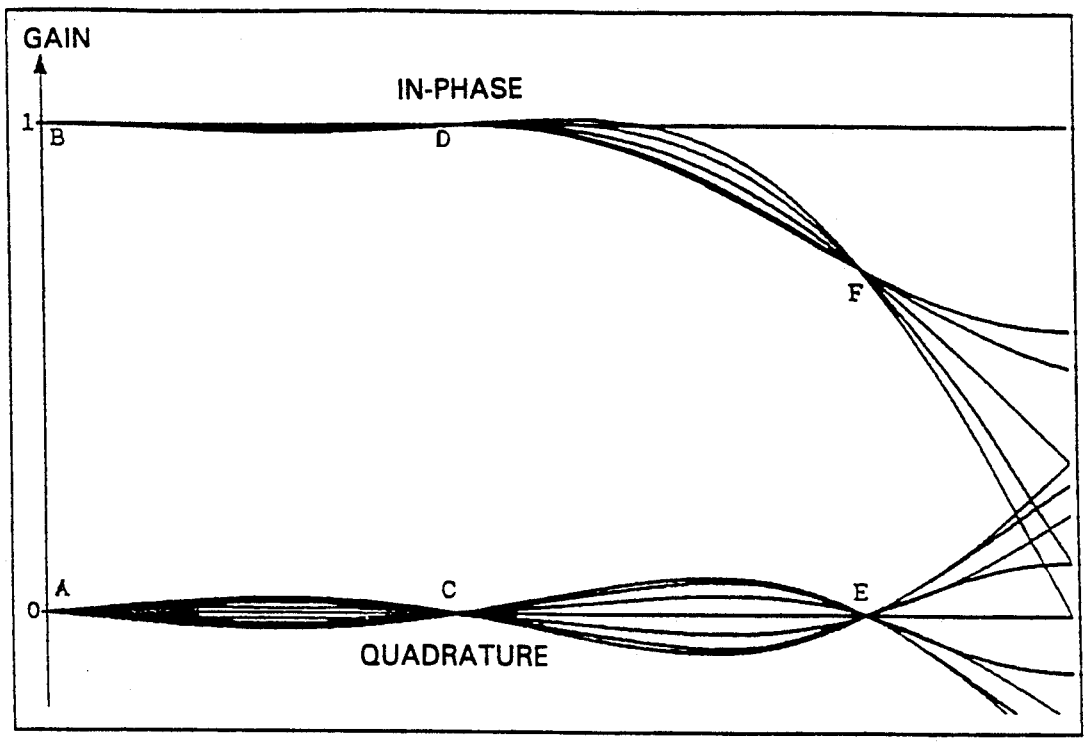
FIG. 8 shows an improved overall frequency response resulting from the inclusion of the pre-gamma de-emphasis into the interpolator in accordance with this invention.
Figure 9:
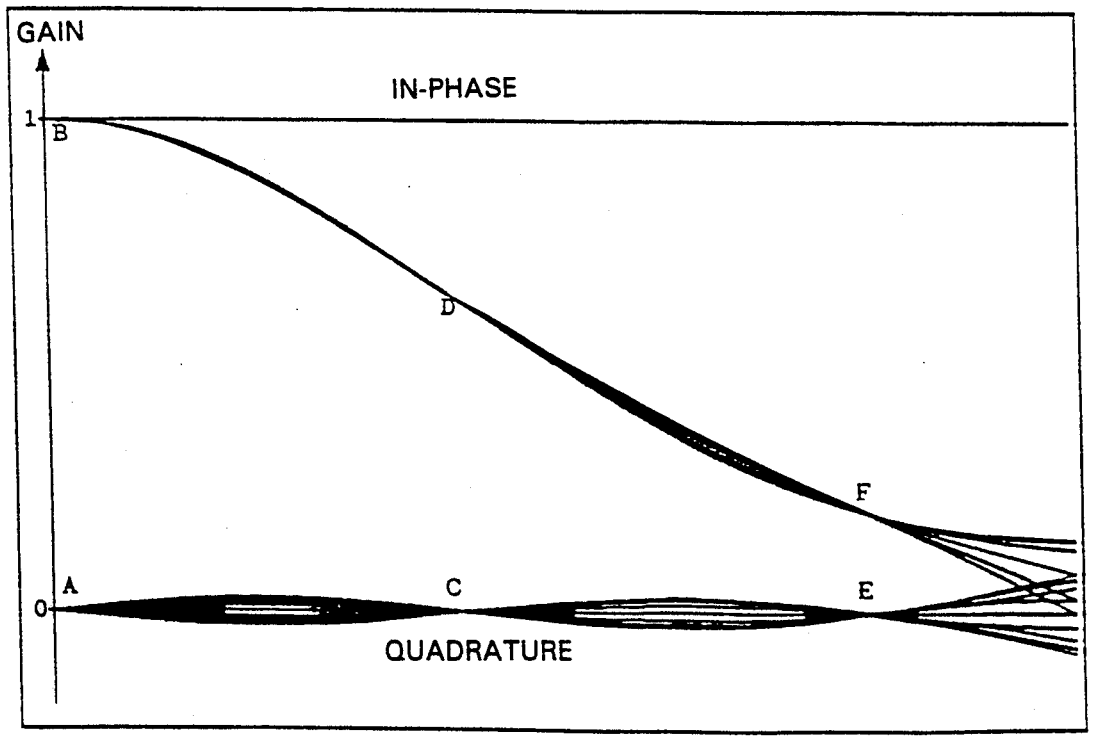
FIG. 9 shows the frequency response of the interpolator including provision for the de-emphasis.

One of the better methods of selecting appropriate coefficients is to choose them such that the in-phase component of the response has a particular value at chosen defined frequencies and that the quadrature component error is zero at defined frequencies, which may be differently chosen. If five coefficients are available, five defined points may be chosen. FIGS. 6, 8 and 9 are based on the defined points for the in-phase response being at frequencies of 0, 0.4 and 0.8 of the Nyquist frequency and the defined points for the quadrature component error being zero are at frequencies of 0.4 and 0.8 of the Nyquist frequency. These particular frequencies have been chosen more to show differences between approaches rather than to give the optimum performance for each approach.

Frequencies can be defined in various ways; cycles per second, radians per second and cycles per picture height are all well known. Since for this purpose it is convenient to work in normalised frequency, one approach would be to express it in terms of the Nyquist frequency, but the approach which will be used is to express the normalised frequency in terms of degrees per sample. The Nyquist limit will then be at 180° per sample and the frequencies of 0, 0.4 and 0.8 of the Nyquist limit will correspond to 0°, 72° and 144° per sample.

Figure 5:
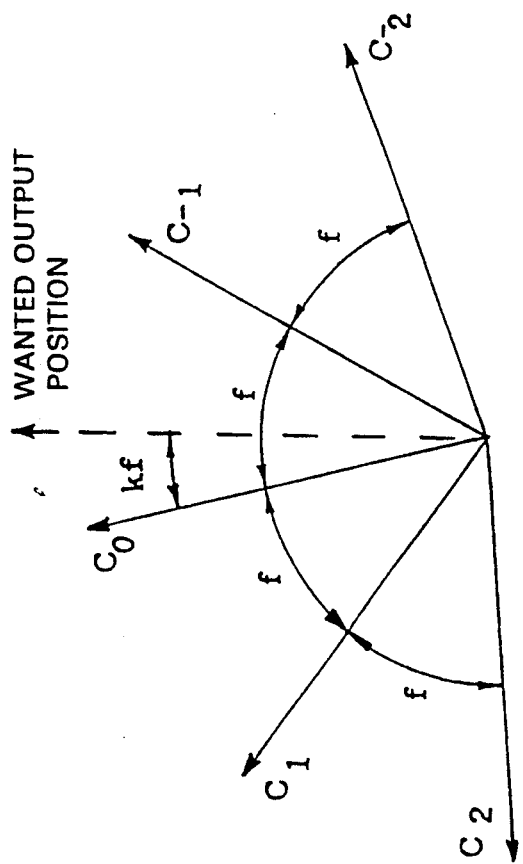
FIG. 5 is a vector diagram illustrating the principles by which interpolation coefficients are calculated.

The principle of the computation is shown in FIG. 5. It is assumed that the input signal will be of cosine wave shape of frequency f° per sample with a peak value of 1 and also that this peak would occur at the wanted output position. The in-phase components, at points marked $-2$, $-1$, 0, 1, 2 will be $\cos(kf-2f)$, $\cos(kf-f)$, $\cos(kf)$, $\cos(kf+f)$ and $\cos(kf+f)$ and $\cos(kf+2f)$, respectively. The quadrature components at the same points will be: sin(kf−2f), sin(kf−f), sin(kf), sin(kf+f) and sin(kf+2f).

The in-phase $E_{in}$ and quadrature $E_{qu}$ outputs of interpolation will be:

$$E_{in} = C_{-2}*\cos(kf - 2f) + C_{-1}*\cos(kf - f) +$$
$$C_0*\cos(kf) + C_1*\cos(kf + f) + C_2*\cos(kf + 2f)$$

$$E_{qu} = C_{-2}*\sin(kf - 2f) + C_{-1}*\sin(kf - f) +$$
$$C_0*\sin(kf) + C_1*\sin(kf + f) + C_2*\sin(kf + 2f)$$

where * indicates the operation of multiplication. It will be noted that since sin(0)=0, the quadrature error component $E_{qu}$ will also be zero at zero frequency.

If $E_{in}$ be defined as 1 at 0° and 72° per sample, and as 0.707 at 144° and $E_{qu}$ be defined as 0 at 72° and 144° per sample, there will be 5 equations, appropriate to evaluate the 5 coefficients.

FIG. 6 shows the frequency response of the in-phase and quadrature gains in a reference system without combined interpolation and de-emphasis. The points B, C, D, E and F are the points where the response was defined. Point A is the additional zero of the quadrature errors at zero frequency. The horizontal direction is frequency, from zero at the left to 180° per sample, at the extreme right of the curves. Horizontal lines at 0 and 1 provide gain references. The individual curves are for different values of k from k=−0.5 to 0.5 in steps of 0.125; this would give 9 curves but since the value of the cosine of an angle is independent of the sign of the angle, mirror image cases superimpose. When k=0 the quadrature error is zero at all frequencies and the curve is superimposed on the horizontal axis.

At any specified frequency, there is little reason to suppose that a given departure of the quadrature error from zero is subjectively more or less objectionable than an equal departure of the in-phase response from unity. However, the subjective effect of an error at high frequencies is much less than the same error at low frequencies. In FIG. 6 the most significant errors are for the quadrature component in the region between A and C.

In the above case in which the gain at F is nominally 0.7071, Table 1 shows the sets of five coefficients obtained from the calculation described above, for each offset k value shown. In the table the sum of the coefficients being used at any time is 512.

TABLE 1

| offset | line | | | | |
|---|---|---|---|---|---|
| | −2 | −1 | 0 | 1 | 2 |
| −0.500 | −78 | 313 | 313 | −78 | 42 |
| −0.375 | −76 | 247 | 370 | −67 | 38 |
| −0.250 | −63 | 178 | 414 | −42 | 25 |
| −0.125 | −42 | 110 | 443 | −3 | 5 |
| 0 | −18 | 48 | 452 | 48 | −18 |
| 0.125 | 5 | −3 | 443 | 110 | −42 |
| 0.250 | 25 | −42 | 414 | 178 | −63 |
| 0.375 | 38 | −67 | 370 | 247 | −76 |
| 0.500 | 42 | −78 | 313 | 313 | −78 |

The combining of the pre-gamma de-emphasis with the interpolation could be achieved by suitable choice of gains at constraint points D and F. An alternative and preferred approach is to select the post-gamma equaliser and to retain the original gains at the constraint points but to use these gains for the cascaded connection of interpolator and equaliser.

The preferred equaliser is a five-tap symmetrical filter with successive coefficients in the proportions 1, −6, 18, −6, 1. These add up to a power of two, when regard is had to the sign of the coefficients.

Figure 7:
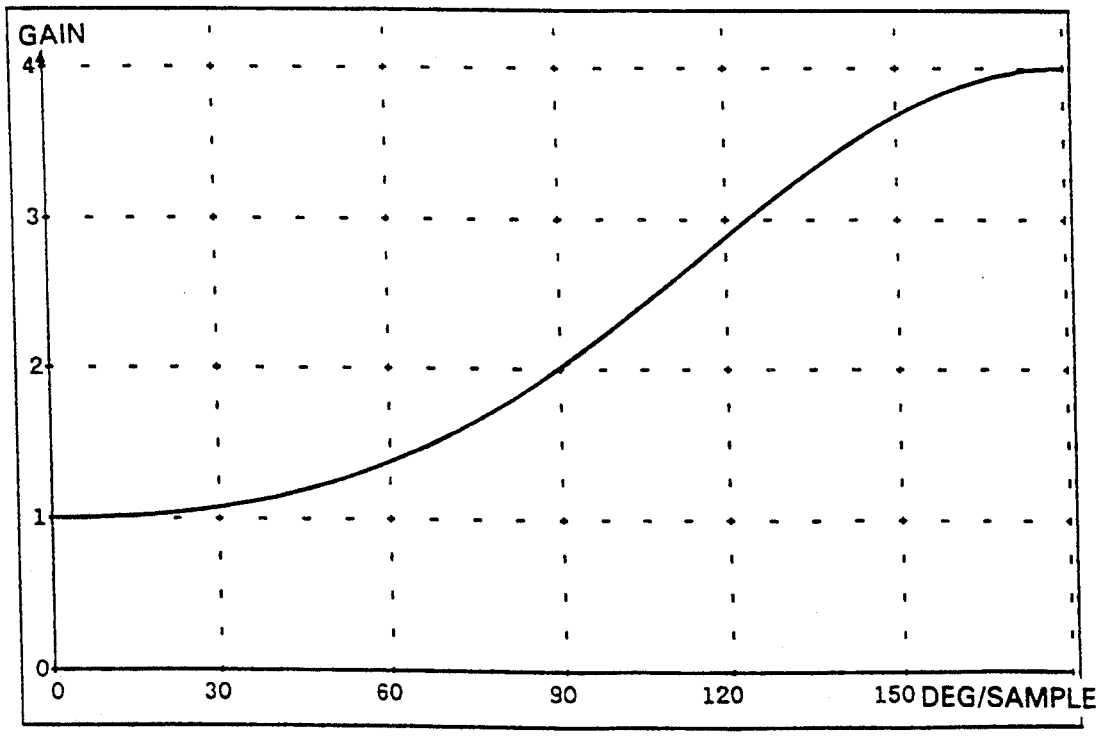
FIG. 7 shows the frequency response of a suitable post-gamma equaliser.

FIG. 7 shows the equaliser frequency response; the gain rises with increasing frequency becoming 2 at 90° per sample and reaching 4 at 180° per sample, compared to the low frequency gain.

FIG. 8 is of the same form as FIG. 6 but shows the overall characteristics of an interpolator, which now includes the pre-gamma de-emphasis, together with the post-gamma equaliser. The constraint points B, C, D, E and F are identical to those used for FIG. 6 but now they constrain the response of the interpolator, with pre-gamma de-emphasis characteristics, together with the separate post-gamma equaliser. By comparison with FIG. 6 it can be seen that the variation of both the in-phase and quadrature responses has been significantly improved, particularly in the region between A and C.

Table 2 shows the sets of effective coefficients for successive lines which would result from a similar calculation to that used for Table 1 for the interpolator and the cascaded preferred 1, −6, 18, −6, 1 equaliser combined. The constraint points remain unchanged.

TABLE 2

| offset | line | | | | | | | | |
|---|---|---|---|---|---|---|---|---|---|
| | −4 | −3 | −2 | −1 | 0 | 1 | 2 | 3 | 4 |
| −0.500 | | 4 | 5 | −71 | 311 | 313 | −82 | 37 | −7 | 2 |
| −0.375 | 2 | | 10 | −71 | 246 | 370 | −70 | 28 | −5 | 2 |
| −0.250 | 2 | | 11 | −61 | 176 | 414 | −44 | 14 | −2 | 2 |
| −0.125 | 1 | | 9 | −44 | 109 | 443 | −5 | −4 | 2 | 1 |
| 0 | 1 | | 6 | −24 | 47 | 452 | 47 | −24 | 6 | 1 |
| 0.125 | 1 | | 2 | −4 | −5 | 443 | 109 | −44 | 9 | 1 |
| 0.250 | 2 | | −2 | 14 | −44 | 414 | 176 | −61 | 11 | 2 |
| 0.375 | 2 | | −5 | 28 | −70 | 370 | 246 | −71 | 10 | 2 |
| 0.500 | 2 | | −7 | 37 | −82 | 313 | 311 | −71 | 5 | 4 |

Note that the information in Table 2 does not show the sets of coefficients used by the interpolator; these are shown in Table 3.

TABLE 3

| offset | line | | | | |
|---|---|---|---|---|---|
| | −2 | −1 | 0 | 1 | 2 |
| −0.500 | 29 | 220 | 220 | 29 | 14 |
| −0.375 | 19 | 194 | 242 | 43 | 14 |
| −0.250 | 14 | 166 | 258 | 61 | 13 |
| −0.125 | 11 | 137 | 269 | 84 | 11 |
| 0 | 10 | 109 | 274 | 109 | 10 |
| 0.125 | 11 | 84 | 269 | 137 | 11 |
| 0.250 | 13 | 61 | 258 | 166 | 14 |
| 0.375 | 14 | 43 | 242 | 194 | 19 |
| 0.500 | 14 | 29 | 220 | 220 | 29 |

Figure 13:
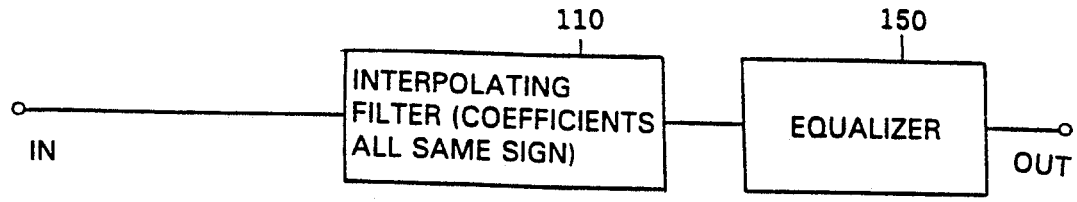
FIG. 13 is an illustration of an interpolating filter, the coefficients of which are all of the same sign, used for reference purposes in illustrating the present invention.
Figure 14:
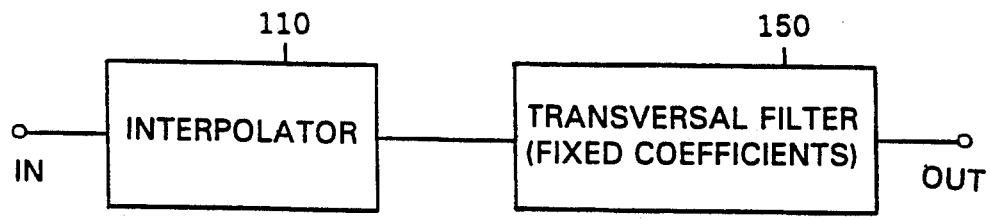
FIG. 14 is an illustration of a transversal filter having fixed coefficients, used for reference purposes in illustrating the present invention.

It should be noted that in this case no coefficient changes sign, which makes the interpolator realisation more simple, indeed all coefficients are positive. An interpolating filter 110 having all coefficients of the same sign is shown, for reference purposes and without detail, in FIG. 13. However, a 5-tap interpolator with variable coefficients is still more complex than the fixed coefficients 1, −6, 18, −6, 1 transversal filter used as the equaliser, even when multipliers are used for the times 6 and times 18 multiplications. A transversal filter 150 used as the equaliser and having fixed coefficients is shown, for reference purposes and without detail, in FIG. 14. It is also relevant that multiplication by 6 can be realised by a single adder, where the data at the two input ports has been shifted by one and two places to higher significance and multiplication by 18 realised when the data has been shifted by one and four places. Obviously, although such techniques are relevant to an equaliser they would not be of use when the coefficients vary, as would be normal for interpolation.

For the same number of taps, there is thus little difference in the complexity of conventional interpolation compared to the realisation using interpolation in conjunction with a fixed transversal equaliser. Frequently, the availability of a part of the signal chain with a modified frequency response can be useful for a number of purposes, for example, non-linear operations of gamma correction. Even when this flexibility is not required, there remains the significant benefit of improved performance, in terms of stability of the frequency response, particularly at lower frequencies, as the offset k is changed.

FIG. 9 is of the same form as FIG. 8, and is for the interpolator with the coefficients of Table 3, which provides suitable de-emphasis to precede gamma correction. The gain falling with increasing frequency shows the pre-gamma de-emphasis provided. The points D and F have been moved near to the curve but the actual gains at these frequencies have not been defined as such, except by implication of the frequency response of the equaliser which would be incorporated after the gamma correction.

It is seen from the above that improved interpolation is obtained without any additional hardware, just by an unusual choice of the processing sequence, namely by combining the interpolation and HF de-emphasis into a single operation. Better interpolation can be achieved with a set of interpolation hardware of given complexity if it is used with an equaliser comprising a transversal filter which provides a gain increasing with increasing frequency, the coefficients used in the interpolation being modified to compensate for the frequency response of the equaliser transversal filter whilst retaining the desired position offset of the output samples with respect to the input samples. This improvement is independent of whether the interpolator comes first or second. However, when non-linear processing such as gamma correction needs to be incorporated, a reduction of alias problems can be achieved by reducing the amplitude of the high frequencies at the point in the chain where the non-linearity occurs; this requires the interpolator to precede the transversal filter.

Figure 10:
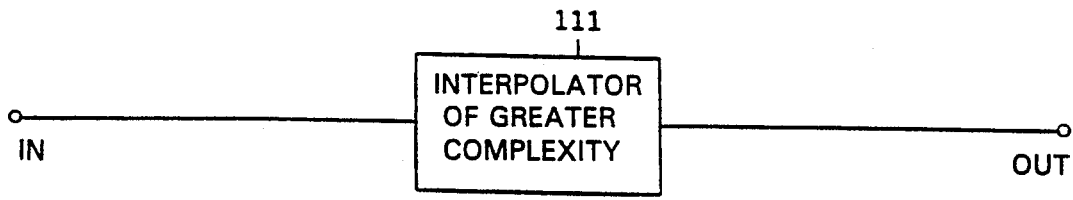
FIG. 10 is an illustration of an interpolator of greater complexity, used for reference purposes in illustrating the present invention.

As the desired flatness of the frequency response of an interpolator increases, the complexity of the interpolator also increases. This is true if the flatness is considered either in terms of the available passband as a proportion of the cut-off frequency or alternatively is considered in terms of the amount of ripple in the passband. A frequent requirement is an essentially flat response, particularly at lower frequencies, up to a frequency close to half the sampling frequency. Examples of such requirements are in the interpolators used in audio signal processing for sample rate changing between sample rates of 44.1 and 32 or 48 kHz and in video signal processing for the interpolation used in standards conversion and in special effects units for the manipulation of picture size and geometry. Purely for reference purposes an interpolator of greater complexity 111 is shown without detail in FIG. 10. This interpolator will have the form of a transversal filter with a relatively large number of taps and most of the coefficients, applied to the signals appearing at these taps, will not only vary in magnitude but also in sign as the desired interpolation offset changes.

Figure 11:
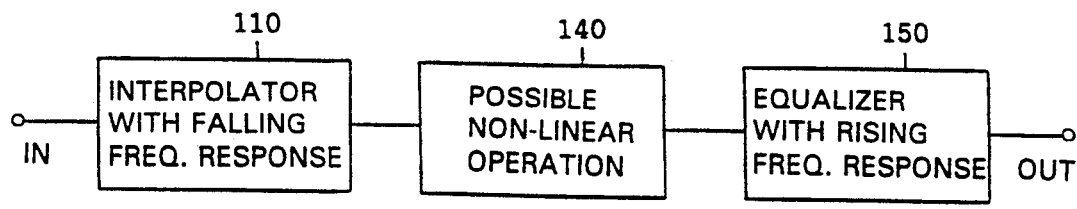
FIG. 11 is a block diagram illustrating the principal components of the preferred embodiment of the invention.

FIG. 11 illustrates the principal components of the preferred embodiment of the invention. The first impression given by FIG. 11 is that it is more complex than FIG. 10. However, if the amount of ripple in the pass-band shown in FIG. 8 were just acceptable, then the results shown in FIG. 6 would not be acceptable; probably it would be necessary to use a 7 or even a 9-tap interpolator to achieve results comparable to those shown in FIG. 8. In addition the interpolation coefficients used in FIG. 8 are all positive, which eases realisation. These simplifications more than compensate for the complication of adding a transversal equaliser which has constant coefficients. Furthermore, the signal passing between the interpolator 110 and equaliser 150 has a modified high frequency content, in the configuration shown a reduced high-frequency content, which would provide an appropriate place for incorporating a non-linear operation 140. Where the non-linearity is such as gamma correction, potential alias problems may be decreased by reducing the high frequency at the point of correction.

Where an abrupt non-linearity is used, such as that required for clipping the amplitude of a signal, less overshoots occur if the equaliser 150 precedes the interpolator 110.

Figure 12:
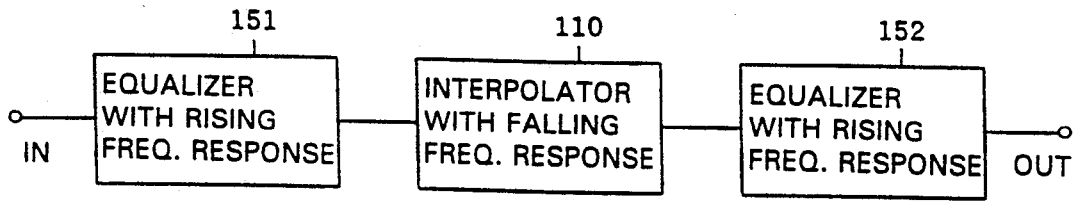
FIG. 12 is a block diagram illustrating a modification of the circuit of FIG. 11.

For some applications, particularly when the desired response extends almost to half the sampling frequency, there may be occasions where it is desirable to have part of the equalisation before and the remainder after the interpolator 110, as shown in FIG. 12, which has a first partial equalisation circuit 151 preceding the interpolator and a second partial equalisation circuit 152 subsequent to it. If all the equalisation were after the interpolation, the large high-frequency gain of the equaliser may make the quantisation noise at the output of the interpolator too apparent. On the other hand if all the equalisation preceded the interpolator, the level of high frequency signals might cause overloading.

When alias reduction of non-linear operations is important, the gain of the interpolator at frequencies exceeding one third that of sampling, should be significantly reduced compared to the low frequency gain. When alias reduction is not important, the significantly reduced gain at a frequency one third of sampling is no longer required. The optimum frequency response for the interpolator would then, in theory, be different, and usually would be chosen to minimise the pass-band ripple of the cascade connection of interpolator and equaliser for a given total complexity of interpolator and equaliser. In practice, the change of optimisation will usually result in little change of pass-band ripple.

A further modification will now be considered. If the luminance channel operates using the castellated method described above on a higher definition standard, such as 1250 lines, but the linear array sensors for the color channels operate at a lower resolution standard, with half the number of lines, then a standards 2:1 up-conversion would be required for the coloring information. One way of incorporating this would be to use interpolators similar to 110 to provide the interpolation for this up-conversion. Two output lines would be required for each input line with the value of offset k, in FIG. 4, differing by 0.5 between the two output lines. Ignoring the requirements of gamma correction and possible post-gamma equalisation there seems to be three alternative realisations.

One way of realisation would be to produce the two lines essentially at the same time, with the multiplication and the algebraic summation operating at twice the word rate with the value of the coefficients alternating, for alternate words, between values appropriate for the two values of k. With this approach the output words would need to be steered, word alternately, to the appropriate lines of the frame store. For this approach the operation of the 1 line delays 111, 112, 113, 114 in each interpolator would be unchanged to that normal for the lower resolution standard.

A second way would be to use a short buffer store prior to the interpolation in which a line of information written in during one line was read out as two identical lines, each lasting half the time. In this case the block diagram of the interpolation shown in FIG. 4 would be unchanged although it would operate at twice the clock rate. The interpolation coefficients would have to alternate between first and second presentations of the input lines. Steering of the output words to appropriate lines of the frame store would still be needed, however this steering would be an output line at a time. This approach would be particularly useful for multipliers in which one input port is much slower than the other.

There is the third possibility of two separate interpolators one providing odd lines to the frame store, the other providing the even lines.

The first two approaches can be used with a single gamma corrector and post-gamma equaliser between the interpolator and the frame store, for each color channel; for the third approach, duplicate gamma correctors and post-gamma equalisers would be required for each channel.

A similar situation can arise with CCD (charge-coupled device) cameras, if the same CCD camera is required to operate on a plurality of television standards without changing the CCD device. More generally, a similar situation will arise whenever standards conversion between two different line standards is involved.

As another example, the MAC transmission standard uses alternate lines for transmitting the R−Y and B−Y color difference signals, and interpolation is used in the receiver to make both available simultaneously. If up-conversion to 1250 lines at the receiver becomes current this interpolation will become more significant. There is a desire to move to true constant luminance transmission, and if this happens then a gamma corrector will be required at the receiver. With both interpolation and gamma correction present, the present invention would then be applicable in a domestic receiver.

Figure 15:
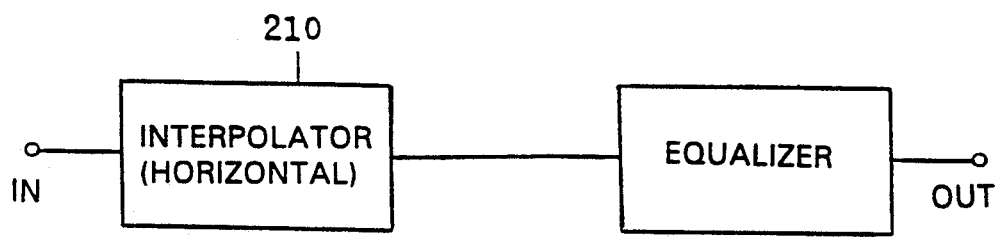
FIGS. 15 to 17, which illustrate interpolators operable in the horizontal, vertical and temporal directions, respectively, are used for reference purposes in illustrating the present invention.
Figure 16:
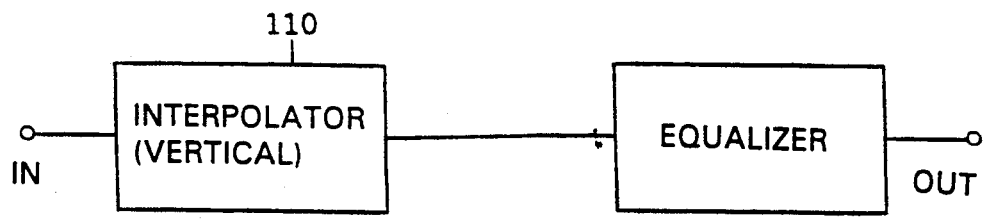
Figure 17:
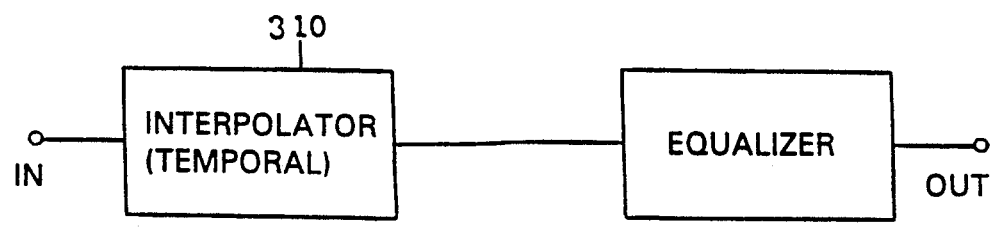

It could also be of importance in special effects processors where the size of stored images is changed. It would also be applicable in non-broadcast situations, such as in desk-top publishing systems, or more generally in other situations where interpolation of sampled signals takes place, e.g. in companding of audio signals. A further example is, as noted above, audio signal sample rate changing from say 31.25 to 32.00 kHz. For some purposes non-real time processing with microprocessors may be appropriate. Whilst preferred embodiments of the invention have been described with reference to vertical interpolators 110 (illustrated for reference purposes and without detail in FIG. 16), interpolators may, as previously mentioned, be horizontal 210 or temporal 310; this is illustrated for reference purposes and again without detail, in FIGS. 15 and 17, respectively.

I claim

1. A method of processing sampled input signals to derive signals appropriate for positions between input samples, comprising the following steps in either order:
    interpolating samples with a filter having the form of a transversal filter; and
    filtering the samples with a filter providing a frequency response where the gain increases with increasing frequency;
    the coefficients of the transversal filter being so chosen as simultaneously to compensate the frequency response of the filtering step and to provide a desired position offset of the output samples with respect to the input samples.

2. A method according to claim 1, in which the coefficients of the interpolating filter are all of the same sign.

3. A method according to claim 1, in which the filtering step is achieved with the use of a transversal filter with fixed coefficients.

4. A method according to claim 1, in which the interpolating step is achieved with the use of an interpolating filter with variable coefficients to provide a variable position offset.

5. A method according to claim 1, in which the interpolating step precedes the filtering step.

6. A method according to claim 5, including a smooth non-linear processing operation between the interpolating and filtering steps.

7. A method according to claim 6, in which the smooth non-linear processing operation performs gamma correction.

8. A method according to claim 1, in which the operations are performed on digital signals.

9. A method according to claim 1, in which the signals being processed are video signals.

10. A method according to claim 9, in which the interpolation is in the horizontal direction.

11. A method according to claim 9, in which the interpolation is in the vertical direction.

12. A method according to claim 9, in which the interpolation is in the temporal direction.

13. Apparatus for processing sampled input signals to derive signals appropriate for positions between input samples, comprising the cascade connection of:
    interpolating filter means having the form of a transversal filter; and
    second filter means providing a frequency response where the gain increases with increasing frequency; and
    the coefficients of the transversal filter being so chosen as simultaneously to compensate the frequency response of the second filter means and to provide a desired position offset of the output samples with respect to the input samples.

14. Apparatus according to claim 13, in which the coefficients of the interpolating filter means are all of the same sign.

15. Apparatus according to claim 13, in which the second filter means is a transversal filter with fixed coefficients.

16. Apparatus according to claim 13, in which the interpolating filter means has variable coefficients to provide a variable position offset.

17. Apparatus according to claim 13, in which the interpolating filter means precedes the second filter means.

18. Apparatus according to claim 17, including means effecting a smooth non-linear processing operation between the interpolating and fixed transversal filters means.

19. Apparatus according to claim 18, in which the means effecting a smooth non-linear processing operation is a gamma corrector.

20. Apparatus according to claim 13, in which the second filter means comprises a first partial filter means preceding the interpolating filter means and a second partial filter means following the interpolating filter means.

21. Apparatus according to claim 13, in which the operations are performed on digital signals.

22. Apparatus according to claims 13, in which the signals being processed are video signals.

23. Apparatus according to claim 22, in which the interpolation is in the horizontal direction.

24. Apparatus according to claim 22, in which the interpolation is in the vertical direction.

25. Apparatus according to claim 22, in which the interpolation is in the temporal direction.

26. A video display device, comprising:
an input for receiving an input video signal;
interpolation means coupled to the input, the interpolation means comprising a transversal filter;
equaliser means coupled in a series circuit with the interpolation means, the equaliser means providing a gain which generally increases with increasing frequency;
a display coupled to the said series circuit to receive an output signal therefrom and display an image in response thereto;
in which the transversal filter in the interpolation means has filter coefficients such as to compensate, in the frequency range relevant to the display, for the frequency response of the equaliser means, and such as to provide a position offset appropriate to the interpolation.

27. A video display device according to claim 26, including a gamma correction circuit coupled between the interpolation means and the equaliser means.

* * * * *